(12) United States Patent
Bohori et al.

(10) Patent No.: US 9,697,951 B2
(45) Date of Patent: Jul. 4, 2017

(54) CONTACTLESS POWER TRANSFER SYSTEM

(71) Applicant: General Electric Company, Schenectady, NY (US)

(72) Inventors: Adnan Kutubuddin Bohori, Karnataka (IN); Suma Memana Narayana Bhat, Karnataka (IN); Arun Kumar Raghunathan, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 729 days.

(21) Appl. No.: 14/012,245

(22) Filed: Aug. 28, 2013

(65) Prior Publication Data

US 2014/0062181 A1   Mar. 6, 2014

(30) Foreign Application Priority Data

Aug. 29, 2012   (IN) .......................... 3574/CHE/2012

(51) Int. Cl.
| | |
|---|---|
| *H02J 17/00* | (2006.01) |
| *H01F 38/14* | (2006.01) |
| *B60L 11/18* | (2006.01) |
| *H02J 5/00* | (2016.01) |

(52) U.S. Cl.
CPC ............ *H01F 38/14* (2013.01); *B60L 11/182* (2013.01); *B60L 11/1825* (2013.01); *B60L 11/1833* (2013.01); *H02J 5/005* (2013.01); *Y02T 10/7005* (2013.01); *Y02T 10/7072* (2013.01); *Y02T 90/121* (2013.01); *Y02T 90/122* (2013.01);

(Continued)

(58) Field of Classification Search
CPC .. H02J 17/00; H02J 5/005; H02J 7/025; H02J 3/01; H01F 38/14; H01F 27/006
USPC ................................................... 307/9.1, 104
See application file for complete search history.

(56) References Cited

U.S. PATENT DOCUMENTS

| | | |
|---|---|---|
| 3,714,384 A | 1/1973 | Burkhardt et al. |
| 4,030,058 A | 6/1977 | Riffe et al. |
| 4,586,767 A | 5/1986 | Benjamin et al. |

(Continued)

FOREIGN PATENT DOCUMENTS

| | | |
|---|---|---|
| CN | 102055250 A | 5/2011 |
| CN | 102136764 A | 7/2011 |

(Continued)

OTHER PUBLICATIONS

Unofficial English translation of Chinese Office Action & Search Report issued in connection with corresponding CN Application No. 201310383553.5 on Jul. 6, 2016.

(Continued)

*Primary Examiner* — Rexford Barnie
*Assistant Examiner* — Joseph Inge
(74) *Attorney, Agent, or Firm* — GE Global Patent Operation; Peter T. DiMauro (57) ABSTRACT

A contactless power transfer system comprising a power exchanging coil configured to exchange power via a magnetic field, a field focusing element for focusing the magnetic field, and a compensation coil having a resonance frequency different from a resonance frequency of the field focusing element for matching an impedance of the contactless power transfer system and compensating a change in phase resulting from a misalignment in the contactless power transfer system.

18 Claims, 9 Drawing Sheets

(52) U.S. Cl.
CPC ............ *Y02T 90/125* (2013.01); *Y02T 90/128* (2013.01); *Y02T 90/14* (2013.01)

(56) References Cited

U.S. PATENT DOCUMENTS

| | | |
|---|---|---|
| 4,788,448 A | 11/1988 | Crowe |
| 5,007,697 A | 4/1991 | Chadha |
| 5,136,270 A | 8/1992 | Hatanaka et al. |
| 5,301,096 A | 4/1994 | Klontz et al. |
| 5,654,621 A | 8/1997 | Seelig |
| 5,690,693 A | 11/1997 | Wang et al. |
| 5,788,033 A | 8/1998 | Lucking et al. |
| 5,831,841 A | 11/1998 | Nishino et al. |
| 6,906,495 B2 | 6/2005 | Cheng et al. |
| 6,912,137 B2 | 6/2005 | Berghegger et al. |
| 6,936,559 B2 | 8/2005 | Li et al. |
| 6,960,968 B2 | 11/2005 | Odendaal et al. |
| 6,970,055 B2 | 11/2005 | Toncich |
| 7,083,452 B2 | 8/2006 | Eriksson et al. |
| 7,186,033 B2 | 3/2007 | Deans |
| 7,323,964 B1 | 1/2008 | Shyu et al. |
| 7,355,122 B2 | 4/2008 | Moore |
| 7,433,655 B2 | 10/2008 | Jacobs et al. |
| 7,471,986 B2 | 12/2008 | Hatlestad |
| 7,521,890 B2 | 4/2009 | Lee et al. |
| 7,576,447 B2 | 8/2009 | Biester et al. |
| 7,690,936 B1 | 4/2010 | Snekkevik et al. |
| 7,717,619 B2 | 5/2010 | Katcha et al. |
| 2008/0093922 A1 | 4/2008 | Layton |
| 2008/0240358 A1 | 10/2008 | Utschig et al. |
| 2008/0265684 A1 | 10/2008 | Farkas |
| 2008/0312852 A1 | 12/2008 | Maack |
| 2009/0058189 A1 | 3/2009 | Cook et al. |
| 2009/0278666 A1 | 11/2009 | Yoda et al. |
| 2010/0065352 A1 | 3/2010 | Ichikawa |
| 2010/0066340 A1 | 3/2010 | Delforge |
| 2010/0115474 A1 | 5/2010 | Takada et al. |
| 2010/0148589 A1* | 6/2010 | Hamam ............... H04B 5/0037 307/104 |
| 2010/0164298 A1 | 7/2010 | Karalis et al. |
| 2010/0237709 A1 | 9/2010 | Hall et al. |
| 2011/0074219 A1* | 3/2011 | Villa Gazulla ......... H02J 5/005 307/104 |
| 2011/0109263 A1 | 5/2011 | Sakoda et al. |
| 2011/0140429 A1 | 6/2011 | Bohori et al. |
| 2011/0169338 A1* | 7/2011 | Kozakai ................. H02J 5/005 307/104 |
| 2011/0175457 A1 | 7/2011 | Komiyama |
| 2011/0234010 A1* | 9/2011 | Bohori .................... H01F 38/14 307/104 |
| 2011/0316349 A1* | 12/2011 | Hashiguchi .......... H04B 5/0093 307/104 |
| 2012/0013198 A1* | 1/2012 | Uramoto ................. H02J 5/005 307/104 |
| 2012/0161696 A1* | 6/2012 | Cook .................... B60L 11/182 320/108 |
| 2012/0235502 A1* | 9/2012 | Kesler ..................... H03H 7/40 307/104 |
| 2012/0245649 A1* | 9/2012 | Bohori ................. A61N 1/3787 607/9 |
| 2012/0306281 A1* | 12/2012 | Bohori ................. H04B 5/0037 307/104 |
| 2013/0154384 A1* | 6/2013 | Nakamura ............. H01F 38/14 307/104 |

FOREIGN PATENT DOCUMENTS

| | | |
|---|---|---|
| CN | 102222967 A | 10/2011 |
| EP | 0433752 | 6/1991 |
| JP | 2009106136 A | 5/2009 |
| JP | 2010114965 A | 5/2010 |
| WO | 0171882 A1 | 9/2001 |
| WO | 2004062959 A1 | 7/2004 |
| WO | 2007008646 A2 | 1/2007 |
| WO | 2007108586 A1 | 9/2007 |
| WO | 2009147574 | 12/2009 |

OTHER PUBLICATIONS

Karalis, et al. "Efficient wireless non-radiative mid-range energy transfer", Elsevier, Annals of Physics 323, pp. 34-48. 2008.

Mazlouman, et al. "Mid-range Wireless Energy Transfer Using Inductive Resonance for Wireless Sensors", ICCD 2009, pp. 517-522.

Hu, "Wireless/Contactless Power Supply: Inductively Converter Solutions", found at http://www.ufindbook.com, printed on Feb. 18, 2011.

Nasa Tech Briefs, "Contactless Rotary Electrical Couplings", Ames Research Center, Moffett Field, California Saturday, Mar. 1, 2003.

Zhang et al., "Wireless Energy Transfer Platform for Medical Sensors and Implantable Devices", Engineering in Medicine and Biology Society, pp. 1045-1048, Sep. 2-6, 2009, Minneapolis, Minnesota.

Zhu et al., "Ultrasonic Energy Transmission and Conversion Using a 2-D MEMS Resonator", Electron Device Letters, vol. 31, Issue 4, pp. 374-376, Apr. 2010.

* cited by examiner

CONTACTLESS POWER TRANSFER SYSTEM

BACKGROUND OF THE INVENTION

Embodiments of the present invention generally relate to power transfer systems and, more particularly, to contactless power transfer systems.

Power transfer systems are employed for transmitting power from one object to another. Based on a method of transmitting power, the power transfer systems can be classified into power transfer systems using physical connections between a transmitter and a receiver for transmitting power and contactless power transfer systems in which there is no physical connection between the transmitter and the receiver.

The contactless power transfer systems employ various methods for transmitting power wirelessly. One such approach is an inductive coupling system that includes a transmitter coil and a receiver coil in which both are inductively coupled to a respective transformer winding and transmit power based on inductive coupling.

In an alternative approach, a resonator based contactless power transfer system is used that includes a three coil system for transmitting power over a distance. The three coils include a transmitter coil, a receiver coil and a resonator for enhancing a resonance coupling between the transmitter coil and the receiver coil. Typically, efficiency and power transfer capability of the contactless power transfer system depends on distances between the transmitter coil and the receiver coil and the physical alignment between the transmitter coil and the receiver coil. The efficiency and the power transfer capability of the three coil system decreases gradually as the distance between the transmitter coil and the receiver coil is increased. In addition, small misalignment between the transmitter coil and the receiver coil results in significant decrease in the efficiency and power transfer capabilities of the three coil systems. Therefore, a more efficient contactless power transfer system with lesser sensitivity to misalignment is desirable in certain applications such as EV charging, for example.

Hence, there is a need for an improved system to address the aforementioned issues.

BRIEF DESCRIPTION OF THE INVENTION

Briefly, in accordance with an embodiment, a contact less power transfer system is provided. The system includes a power exchanging coil configured to exchange power via a magnetic field. The system also includes a field focusing element for focusing the magnetic field. The system further includes a compensation coil having a resonance frequency different from a resonance frequency of the field focusing element for matching an impedance of the contactless power transfer system and compensating a change in phase resulting from a misalignment in the contactless power transfer system.

In an embodiment, a system including a first power exchanging coil is provided. The system also includes a contactless power transfer system that is coupled to the first power exchanging coil and the contactless power transfer system exchanges power with the first power exchanging coil via a magnetic field. The contactless power transfer system includes a second power exchanging coil configured to exchange power via the magnetic field and a field focusing element for focusing the magnetic field. The contactless power transfer system also includes a compensation coil having a resonance frequency different from a resonance frequency of the field focusing element for matching an impedance of the contactless power transfer system and compensating a change in phase resulting from a misalignment of the contactless power transfer system with respect to the first power exchanging coil.

In an embodiment, a method for contactless power transfer is provided. The method includes generating a magnetic field from power received from a power source. The method also includes focusing the magnetic field onto the power exchanging coil by a field focusing element. The method further includes compensating a change in phase and matching an impedance using a compensation coil for enhancing power exchanging capability of the power exchanging coil wherein the compensation coil comprises a resonant frequency different from a resonance frequency of the field focusing element.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a system and method for contactless power transfer. The system includes a power exchanging coil that exchanges power via a magnetic field. The system also includes a field focusing element that focuses the magnetic field onto the power exchanging coil. The system further includes a compensation coil that matches an impedance of the contactless power transfer system and also compensates for a change in phase resulting from a misalignment in the contactless power transfer system. The contactless power transfer system will be described in greater detail with respect to FIG. 1 below.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. Specifically, unless indicated otherwise, the term "coupled" includes resonance coupling that is defined as a coupling between two or more resonators such that they are able to exchange power when excited at a particular frequency. The terms "power exchanging coil" and "second power exchanging coil" are used interchangeably in the specification and convey the same meaning for the purposes of this specification. Also, the terms "magnetic field" and "resultant magnetic field" are used interchangeably in the specification and convey the same meaning for the purposes of this specification.

Figure 1:
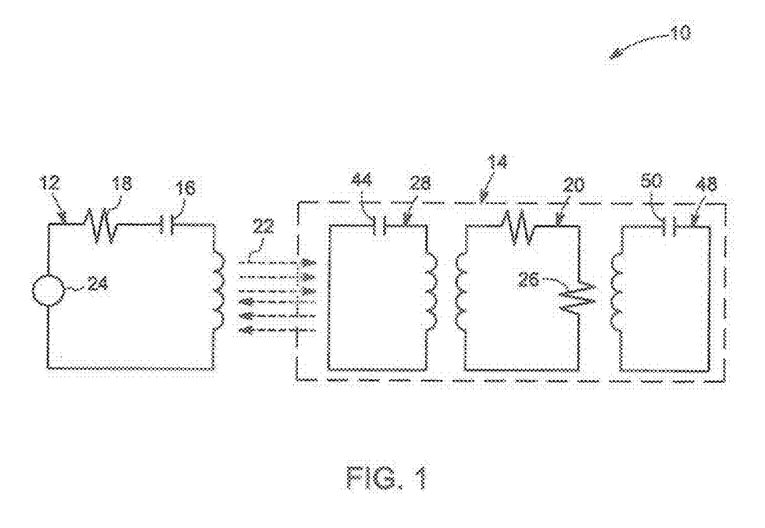
FIG. 1 is a schematic representation of a system including a first power exchanging coil coupled to a contactless power transfer system including a second power exchanging coil in accordance with an embodiment of the invention.

FIG. 1 is a schematic representation of a system 10 including a first power exchanging coil 12 coupled to a contactless power transfer system 14 in accordance with an embodiment of the invention. The first power exchanging coil 12 is coupled to a coil capacitor 16 and includes an internal resistance depicted by resistance 18. The contactless power transfer system 14 includes a second power exchanging coil 20 that exchanges power with the first power exchanging coil 12 via a magnetic field 22. In an exemplary embodiment, the first power exchanging coil 12 includes a transmitter coil and the second power exchanging coil 20 includes a receiver coil. Specifically, in the aforementioned embodiment, the second power exchanging coil 20 in the contactless power transfer system 14 is configured as the receiver coil. However, any one of the first power exchanging coil 12 or the second power exchanging coil 20 may be configured to operate as the transmitter coil or the receiver coil in different embodiments based on system requirements. For better understanding, an embodiment where the first power exchanging coil 12 represents the transmitter coil and the second power exchanging coil 20 represents the receiver coil is discussed below.

In an embodiment, and with continued reference to FIG. 1, the first power exchanging coil 12 is electrically coupled to a power source 24 and the second power exchanging coil 20 is electrically coupled to a load 26. In an exemplary embodiment, the load 26 includes an energy storage device. The first power exchanging coil 12 receives power from the power source 24 and converts the power into the magnetic field 22. The power is transmitted to the contactless power transfer system 14 via the magnetic field 22. The contactless power transfer system 14 also includes a field focusing element 28 that focuses the magnetic field 22 transmitted by the first power exchanging coil 12 onto the second power exchanging coil 20.

Figure 2:
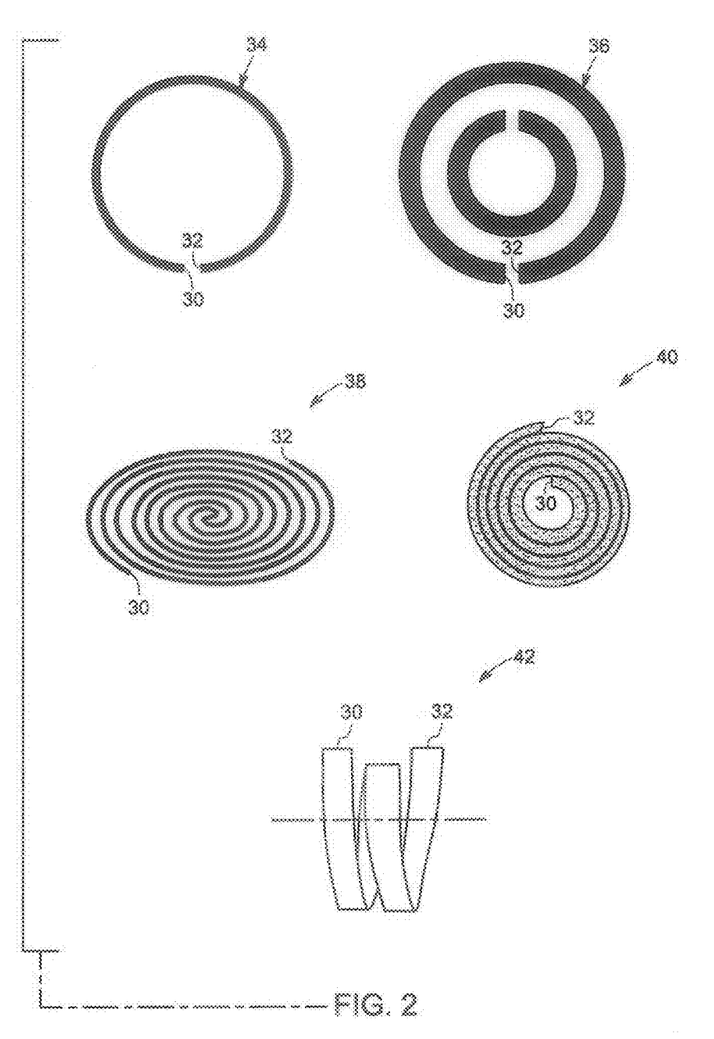
FIG. 2 is a schematic representation of various resonator structures used in the field focusing element in accordance with an embodiment of the invention.

The field focusing element 28 includes a resonant coil having ends 30 and 32 that may include various structures as depicted in FIG. 2. In an embodiment, the field focusing element 28 includes a single loop coil 34. In an embodiment, the field focusing element 28 includes multiple turns such as in a split ring structure 36, spiral structure 38, Swiss-roll structure 40, or helical coil 42. Selection of a structure for a particular application is determined by the size and self-resonating frequency of the field focusing element 28.

Referring back to FIG. 1, in an embodiment, the ends 30, 32 of the field focusing element 28 are coupled to a field focusing capacitor 44 that forms a capacitively loaded coil as represented in FIG. 1, which upon excitation, amplifies the magnetic field 22 received from the first power exchanging coil 12 and transmits an amplified magnetic field (not shown) to the second power exchanging coil 20.

In an embodiment, the ends 30, 32 of the field focusing element 28 are left open and the field focusing capacitor 44 is not coupled to the ends 30, 32 of the field focusing element 28. In such an embodiment, the field focusing element 28 behaves as a self-resonant coil and when the first power exchanging coil 12 is excited at a resonant frequency of the field focusing element 28, a standing wave current distribution is developed within the field focusing element 28 between the open ends 30, 32 of the field focusing element 28. The standing wave current distribution leads to a non-uniform magnetic field distribution around the field focusing element 28. Such non-uniform current distribution is configured to focus the magnetic field 22 in any desired direction, such as, in a direction of the second power exchanging coil 20 in this example. When operating at resonant frequency, even a small excitation to the field focusing element 28 produces large amplitude of current distribution along the length of the field focusing element 28. Large current magnitude of non-uniform distribution leads to an amplified and focused magnetic field in the direction of the second power exchanging coil 20 that results in higher efficiency of power transfer. Greater details of the operation of the field-focusing element 28 are described in commonly assigned U.S. patent application Ser. No. 12/731,497, filed on Mar. 25, 2010 and U.S. patent application Ser. No. 12/914,512, filed on Oct. 28, 2010, which are hereby incorporated by reference in their entirety.

Figure 3:
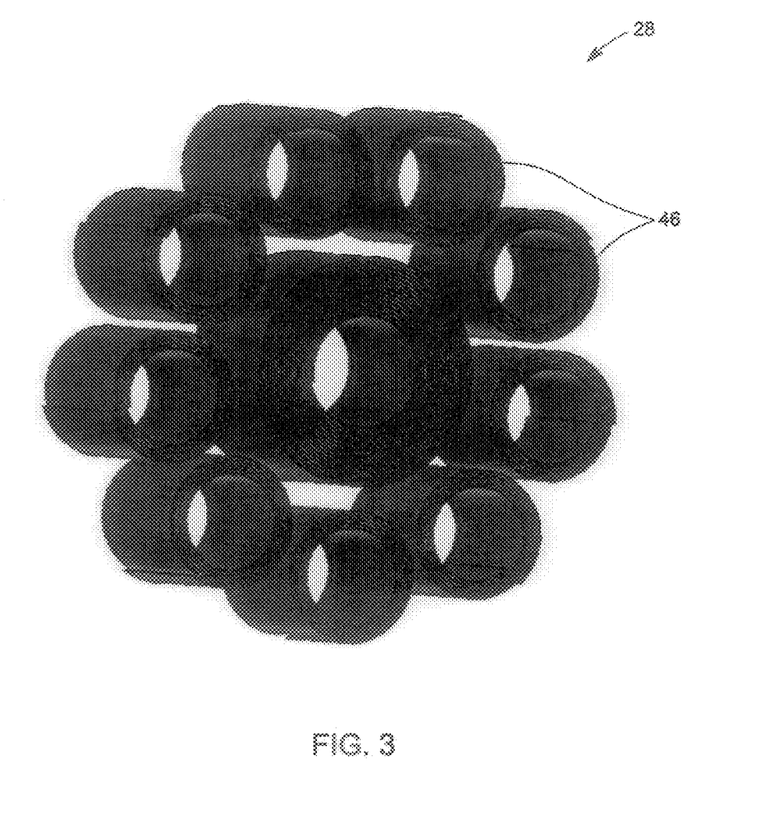
FIG. 3 is a schematic representation of an exemplary field focusing element including a plurality of resonators arranged in an array for focusing a magnetic field from the first power exchanging coil to the second power exchanging coil in accordance with an embodiment of the invention.

Furthermore, FIG. 3 depicts a schematic representation of an exemplary embodiment of the field focusing element 28 that includes at least one resonator arranged in an array to focus the magnetic field onto the second power exchanging coil 20. More specifically, the field focusing element 28 includes a plurality of resonators 46 arranged in the array and the plurality of resonators 46 are configured to operate as a single unit wherein a resultant magnetic field 22 is induced by the respective magnetic fields of the plurality of resonators 46 in the array by interfering constructively (adding) in a desired direction to achieve magnetic field focusing and interfering destructively (canceling each other) in the remaining space. Although, an embodiment of the array is shown, there may be various other forms of array that can be formed from the plurality of resonators 46. The resultant magnetic field 22 is transmitted to the second power exchanging coil 20 that is electrically coupled to the load (FIG. 1). Moreover, in a particular embodiment, the at least one resonator includes at least two different resonance frequencies. For example, one resonator 46 may include two different resonance frequencies or two resonators 46 may each include a different resonant frequency. In a more specific embodiment, having at least two different resonance frequencies enables transfer of power and data signals simultaneously.

Referring back to FIG. 1, to enhance the resonance coupling between the first power exchanging coil 12 and the second power exchanging coil 20, the contactless power transfer system 14 includes a compensation coil 48 that is coupled to the second power exchanging coil 20 and is further electrically coupled to a compensation coil capacitor 50. The compensation coil 48 matches the impedance of the contactless power transfer system 14 and compensates for the change in phase resulting from any misalignment of the contactless power transfer system 14 with respect to the first power exchanging coil 12. As used herein, the term "misalignment" means any angular deviation between the first power exchanging coil (e.g., first power exchanging coil 12) and the contactless power transfer system (e.g., contactless power transfer system 14). Notably, the field focusing element 28, the second power exchanging coil 20 and the compensation coil 48 are coupled to each other in a relatively fixed position and form the contactless power transfer system 14. Any misalignment in the system 10 would be between the contactless power transfer system 14 and the first power exchanging coil 12 and should not be interpreted as a misalignment between the individual components of the contactless power system 14. In an exemplary embodiment, the second power exchanging coil 20 is coupled between the field focusing element 28 and the compensation coil 48. In one embodiment, the compensation coil 48 and the field focusing element 28, each operate at different resonant frequencies with respect to each other. In an embodiment, the resonant frequency of the compensation coil 48 is higher than the resonant frequency of the field focusing element 28. This provides a capacitive reactance to the contactless power transfer system 14 and compensates for a lagging power factor in the system 10. In an embodiment, the compensation coil 48 operates at twice the frequency of the second power exchanging coil 20. In an embodiment, the resonant frequency of the compensation coil 48 is lower than the resonant frequency of the field focusing element 28. This provides an inductive reactance to the contactless power transfer system 14 and compensates for a leading power factor in the system 10. In an exemplary embodiment, the resonant frequency of the field focusing element 28 is equal to the resonant frequency of the first power exchanging coil 12 and therefore, by extension, the resonant frequency of the compensation coil 48 is different from the resonant frequency of the first power exchanging coil 12.

During operation, the compensation coil 48 behaves as a capacitor due to the relatively higher resonant frequency as compared to the field focusing element 28 and provides capacitive reactance to the system 10 that increases efficiency and power transfer capabilities of the system 10. The efficiency of the system 10 depends on the input power factor of the system 10 and the efficiency of the system 10 is enhanced by increasing the input power factor of the system 10. The capacitive reactance provided by the compensation coil 48 results in impedance matching and reduces the current drawn by the system 10 for transmitting power to the load 26 and hence improves the input power factor of the system 10 resulting in enhanced efficiency.

Moreover, the capacitive reactance provided by the compensation coil 48 increases the power transfer capability of the system 10 by increasing a power output of the system 10. The power output at the load 26 depends on a total reflected impedance of the system 10 and the capacitive reactance provided by the compensation coil 48 reduces the total reflected impedance, which in turn increases the power transfer capability of the system 10. Due to the enhanced efficiency and the power transfer capability of the system 10, the first power exchanging coil 12 and the contactless power transfer system 14 are said to have enhanced coupling between each other.

Figure 4:
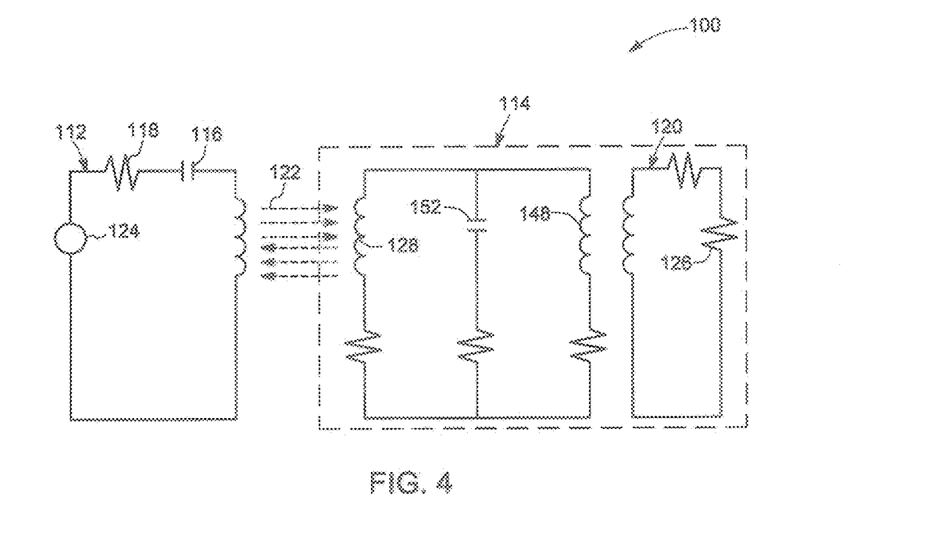
FIG. 4 is a schematic representation of a system including a contactless power transfer system further including a field focusing element and a compensation coil electrically coupled to each other in accordance with an embodiment of the invention.

FIG. 4 is a schematic representation of a system 100 including a first power exchanging coil 112 including an internal resistance 118 and electrically coupled to a coil capacitor 116 and a power source 124. The system 100 also includes a contactless power transfer system 114 that further includes a field focusing element 128, a second power exchanging coil 120 electrically coupled to a load 126 and a compensation coil 148 electrically coupled to the field focusing element 128 in accordance with an embodiment of the invention. The present embodiment includes the field focusing element 128 and the compensation coil 148 coupled to each other wherein the compensation coil 148 is coupled between the field focusing element 128 and a second power exchanging coil 120. The field focusing element 128 and the compensation coil 148 share a common capacitor 152 which generally comprises a capacitance higher than that of the capacitors 44 and 50 used in FIG. 1. The common capacitor approach helps in reducing costs and losses when compared to the system 10 of FIG. 1. The first power exchanging coil 212 generates a magnetic field 122 from the power received from the power source 124 and transmits the magnetic field 122 to the contactless power transfer system 114. Further details of the operation of system 100 can be referred from the above mentioned description of system 10 of FIG. 1.

Figure 5:
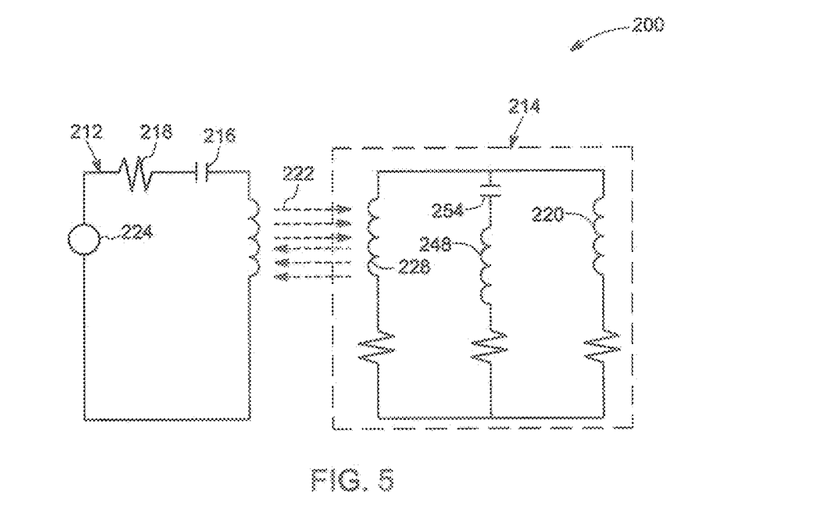
FIG. 5 is a schematic representation of a system including a contactless power transfer system further including a field focusing element, a compensation coil and a second power exchanging coil electrically coupled to each other in accordance with an embodiment of the invention.

FIG. 5 is a schematic representation of a system 200 including a first power exchanging coil 212 that includes an internal resistance 218 and electrically coupled to a coil capacitor 216 and a power source 224. The system 200 also includes a contactless power transfer system 214 that includes a field focusing element 228, a second power exchanging coil 220 and a compensation coil 248 electrically coupled to each other in accordance with an embodiment of the invention. As discussed above, the first power exchanging coil 212 transfers power to the second power exchanging coil 220 that is electrically coupled to a load 226. The power at the output (not shown) of the second power exchanging coil 220 is calculated by determining a difference between power received by the second power exchanging coil 220 and the total internal losses of the second power exchanging coil 220. One such component of the total internal losses includes self-inductance losses. In the present embodiment, the self-inductance losses are canceled by the capacitive reactance provided by the compensation coil 248 resulting in higher power at the load 226 as compared to the conventional system (not shown). Furthermore, the present embodiment enables the contactless power transfer system 214 to share the one capacitor 254, establish resonance between the second power exchanging coil 220 and the field focusing element 228, provide phase compensation for the contactless power transfer system 214 and reduce the self-induction losses in the second power exchanging coil 220. The first power exchanging coil 212 generates a magnetic field 222 from the power received from the power source 224 and transmits the magnetic field 222 to the contactless power transfer system 214. Further details of the operation of system 200 may be referred from the above mentioned description of system 10 of FIG. 1.

Figure 6:
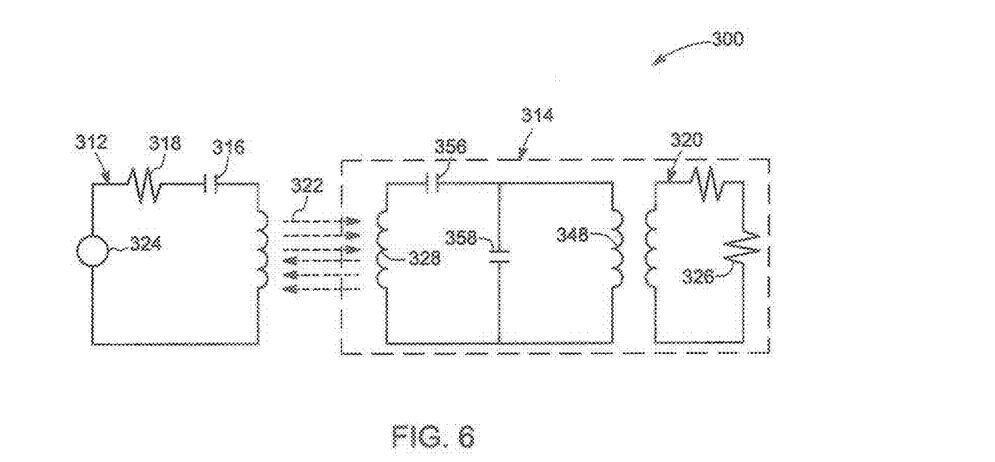
FIG. 6 is a schematic representation of a system including a contactless power transfer system further including a second power exchanging coil, a field focusing element and a compensation coil wherein the field focusing element and a compensation coil electrically coupled to a T-type capacitor configuration in accordance with an embodiment of the invention.

FIG. 6 is a schematic representation of a system 300 including a first power exchanging coil 312 that includes an internal resistance 318 and electrically coupled to a coil capacitor 316 and a power source 324. The system 300 also includes a contactless power transfer system 314 that includes a field focusing element 328, a second power exchanging coil 320 coupled to a load 326 and a compensation coil 348 wherein the field focusing element 328 and the compensation coil 348 are electrically coupled to a T-type capacitor configuration in accordance with an embodiment of the invention. The present embodiment includes a first capacitor 356 and a second capacitor 358 coupled to the field focusing element 328 and the compensation coil 348 in a T-type configuration as shown. The first capacitor 356 is coupled to the field focusing element 328 and the compensation coil 348 in a series connection and the second capacitor 358 is coupled to the field focusing element 328 and the compensation coil 348 in a parallel connection. The first capacitor 356 provides a series resonance in the contactless power transfer system 314 resulting in maximum impedance in the contactless power transfer system 314. The second capacitor 358 leads to a parallel resonance in the contactless power transfer system 314 and provides minimum impedance in the contactless power transfer system 314. Therefore, during operation of the system 300, the second capacitor 358 provides capacitive reactance to the system 300 that compensates for the impedance in the system 300 and results in enhanced coupling within the system 300. The first power exchanging coil 312 generates a magnetic field 322 from the power received from the power source 324 and transmits the magnetic field 322 to the contactless power transfer system 314. Further details of the operation of system 300 can be referred from the above mentioned description of system 10 of FIG. 1.

Figure 7:
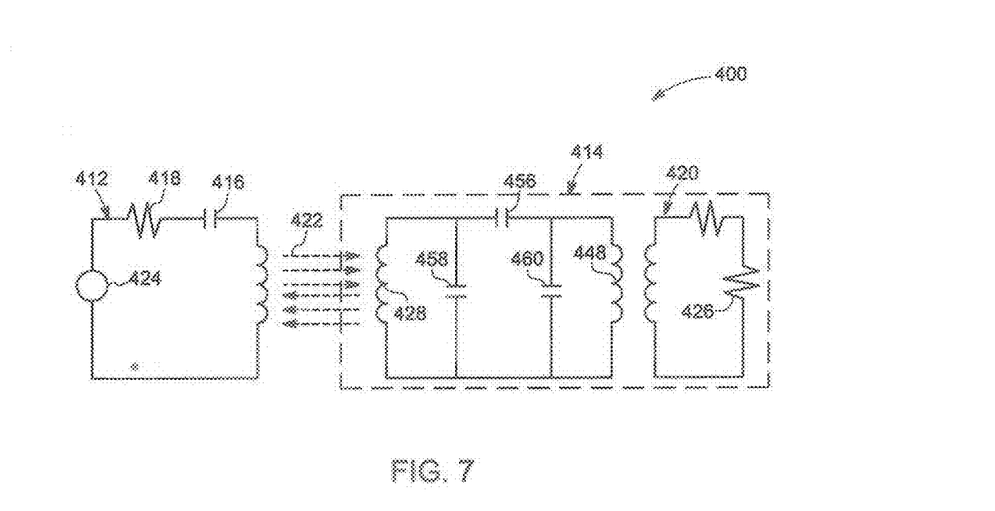
FIG. 7 is a schematic representation of a system including a contact less power transfer system further including a second power exchanging coil, a field focusing element and a compensation coil, wherein the field focusing element and a compensation coil are electrically coupled to a Pie-type capacitor configuration in accordance with an embodiment of the invention.

FIG. 7 is a schematic representation of a system 400 including a first power exchanging coil 412 that includes an internal resistance 418 and is electrically coupled to a coil capacitor 416 and a power source 424. The system 400 also includes a contactless power transfer system 414 that includes a field focusing element 428, a second power exchanging coil 420 coupled to a load 426 and a compensation coil 448 wherein the field focusing element 428 and the compensation coil 448 are electrically coupled to a Pie-type capacitor configuration in accordance with an embodiment of the invention. The contactless power transfer system 414 includes a first capacitor 456, a second capacitor 458 and a third capacitor 460 electrically coupled to the field focusing element 428 and the compensation coil 448. The first capacitor 456 is coupled to the field focusing element 428 and the compensation coil 448 in a series connection. The second capacitor 458 and the third capacitor 460 are electrically coupled to the field focusing element 428 and the compensation coil 448 in a parallel connection to form the Pie-type capacitor configuration. The third capacitor 460 is provided to further increase the efficiency and the power transfer capability of the system 300 provided in FIG. 5 by providing an additional capacitor in parallel to the field focusing element 428 and the compensation coil 448. The first power exchanging coil 412 generates a magnetic field 422 from the power received from the power source 424 and transmits the magnetic field 422 to the contactless power transfer system 414. Further details of the operation of system 400 can be referred from the above mentioned description of system 10 of FIG. 1.

Figure 8:
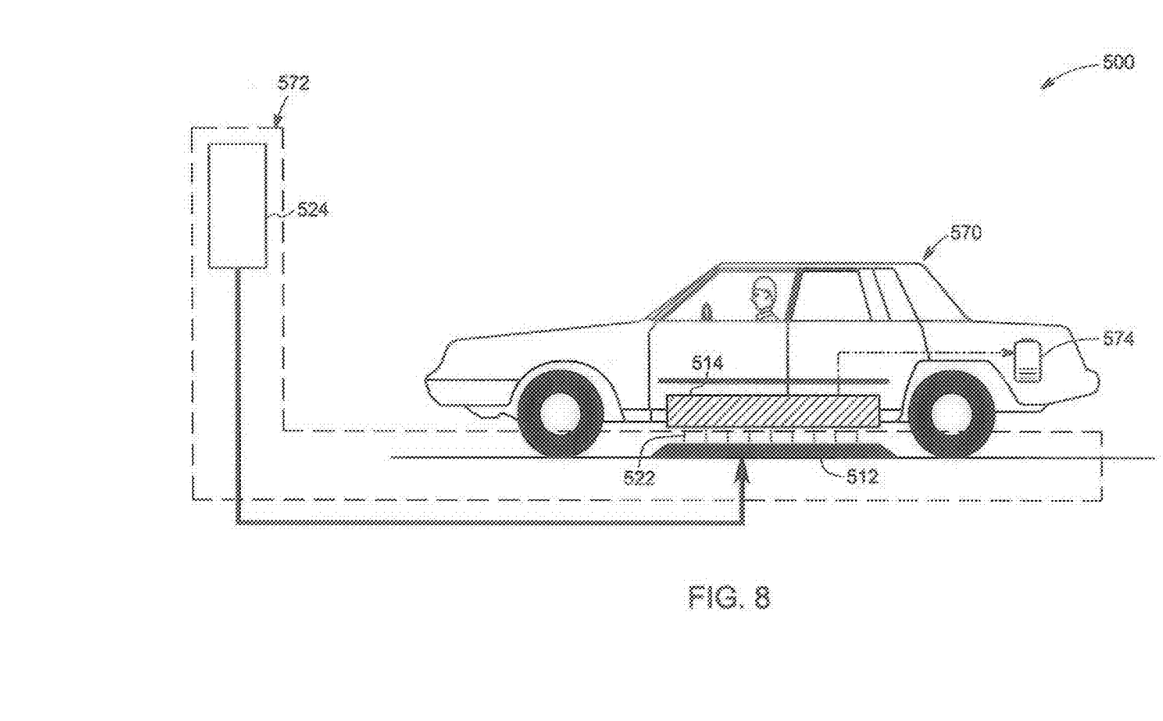
FIG. 8 is a schematic representation of an electric vehicle charging system including a contactless power transfer system electrically coupled to an electric vehicle for charging the electric vehicle in accordance with an embodiment of the invention.

FIG. 8 is a schematic representation of an electric vehicle charging system 500 including a contactless power transfer system 514 electrically coupled to an electric vehicle 570 for charging the electric vehicle 570 in accordance with an embodiment of the invention. The contactless power transfer system 514 includes the field focusing element, the second power exchanging coil and the compensation coil coupled to each other as described above in FIG. 1, for example. The present embodiment includes a charging station 572 that includes the first power exchanging coil 512 and the electric vehicle 570 that includes the contactless power transfer system 514. The contactless power transfer system 514 is electrically coupled to an energy storage element 526 provided in the electric vehicle 570 that stores power for operating the electric vehicle 570. The first power exchanging coil 512 receives power from a power source 524 electrically coupled to the charging station 572 and converts the power to the magnetic field 522. The magnetic field 522 is transmitted to the field focusing element of the contactless power transfer system 514 that focuses the magnetic field 522 to the second power exchanging coil. The second power exchanging coil receives the power from the first power exchanging coil 512 via the magnetic field 522. The contactless power transfer system 514 includes the compensation coil that enhances the coupling between the first power exchanging coil 512 and the second power exchanging coil by matching the impedance and compensating for the change in phase resulting in higher efficiency and higher power transfer capability. The second power exchanging coil transmits the power to the energy storage element 526 for charging the energy storage element 526. In an embodiment, the energy storage element 526 and the charging station 572 exchange data, such as charging data, via the first power exchanging coil 512 and the second power exchanging coil during operation. In a specific embodiment, the first power exchanging coil 512 and the second power exchanging coil are configured to handle a bidirectional flow of power between the first power exchanging coil 512 and the second power exchanging coil. Further details of the operation of system 500 can be referred from the above mentioned description of system 10 of FIG. 1.

Figure 9:
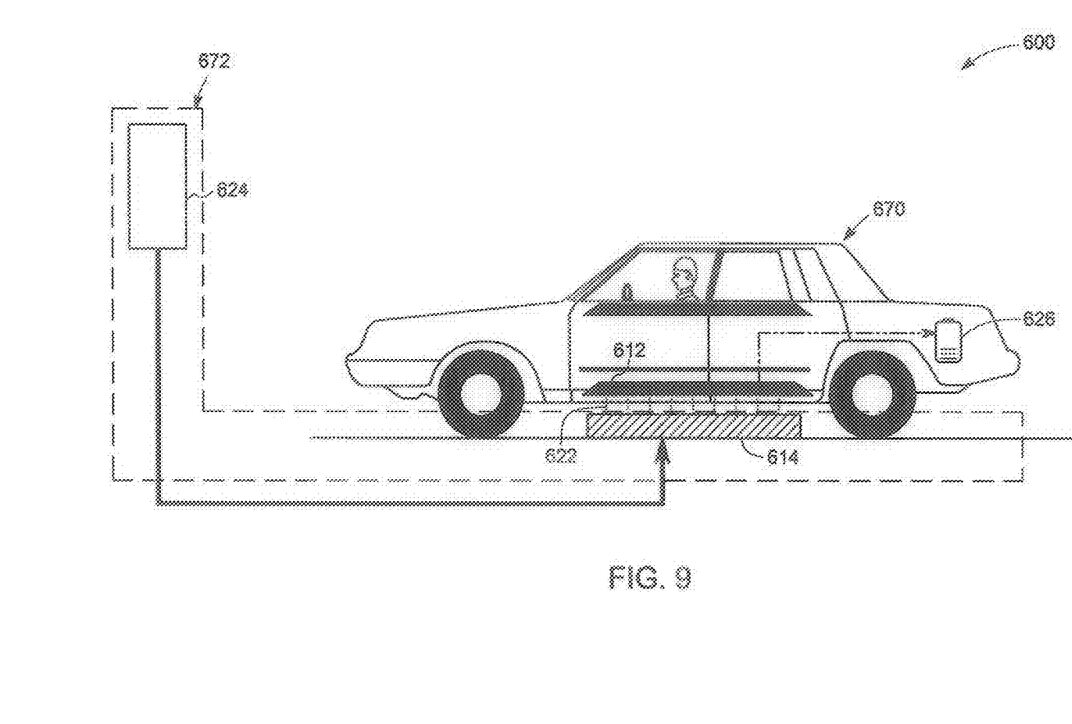
FIG. 9 is a schematic representation of an electric vehicle charging system including a contactless power transfer system electrically coupled to a charging station for charging an electric vehicle in accordance with an embodiment of the invention.

FIG. 9 is a schematic representation of an electric vehicle charging system 600 including a contactless power transfer system 614 electrically coupled to a charging station 672 for charging an electric vehicle 670 in accordance with an embodiment of the invention. In this particular embodiment, the contactless power transfer system 614 is electrically coupled to the charging station 672 and a first power exchanging coil 612 is electrically coupled to the electric vehicle 670. The contactless power transfer system 614 receives power from a power source 624 and converts the power to the magnetic field 622 that is transmitted to the first power exchanging coil 612 which receives the power via the magnetic field 622 and transmits the power to an energy storage element 626. Further details of the operation of system 600 can be referred from the above mentioned description of system 500 of FIG. 8.

Figure 10:
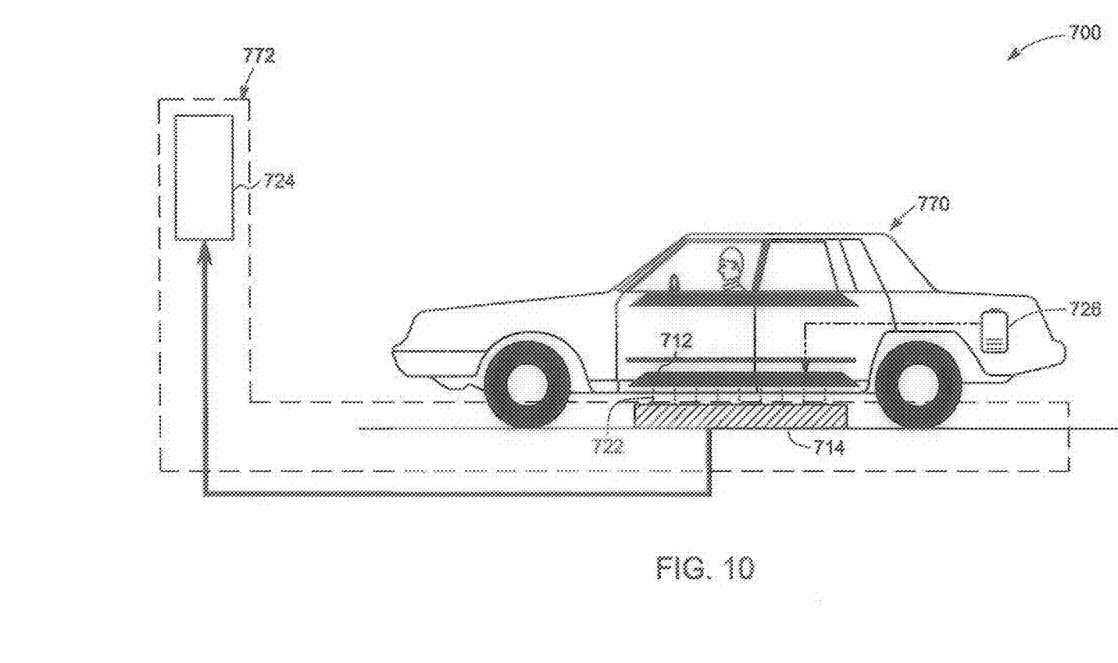
FIG. 10 is a schematic representation of an electric vehicle charging system including a contactless power transfer system electrically coupled to a charging station for transmitting power from an energy storage device coupled to the electric vehicle to a power grid in accordance with an embodiment of the invention.

FIG. 10 is a schematic representation of an electric vehicle charging system 700 including a contactless power transfer system 714 electrically coupled to a charging station 772 for transmitting power from the energy storage element 726 electrically coupled to an electric vehicle 770 to a power grid (not shown) via the charging station 772 in accordance with an embodiment of the invention. In situations where the energy storage element 726 includes stored power, the energy storage element 726 may transmit the stored power from the energy storage element 726 to the power grid via the charging station 772. A first power exchanging coil 712 and a second power exchanging coil are configured to handle bidirectional flow of power as described above and therefore, the power from the first power exchanging coil 712 is transmitted to the contactless power transfer system 714 via a magnetic field 722 that includes the second power exchanging coil which is in turn electrically coupled to the charging station 772. In an embodiment, the contactless power transfer system 714 may be electrically coupled to the energy storage element 726 and the first power exchanging coil 712 may be electrically coupled to the charging station 772 for transmitting power from the energy storage element 726 to the power grid via the charging station 772.

Figure 11:
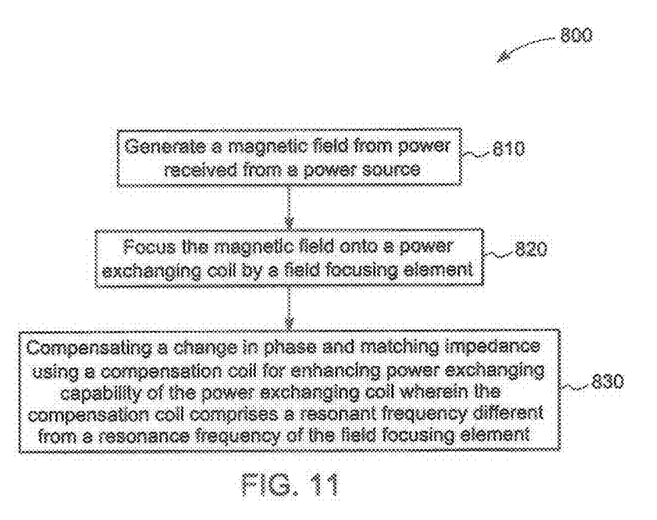
FIG. 11 is a flowchart representing steps involved in a method for contactless power transfer in accordance with an embodiment of the invention.

FIG. 11 is a flowchart representing steps involved in a method 800 for contactless power transfer in accordance with an embodiment of the invention. In step 810, a magnetic field is generated from power received from a power source. The magnetic field is focused onto the power exchanging coil by a field focusing element in step 820. Furthermore, a compensation coil is used for enhancing power exchanging capability of the power exchanging coil by compensating a change in phase and matching an impedance of the contactless power transfer system wherein the compensation coil comprises a resonant frequency different from a resonance frequency of the field focusing element in step 830.

The various embodiments of the contactless power transfer system described above provide a more efficient contactless power transfer system. The system described above provides better tolerance to misalignment, constant output power and reduces the stress on power electronics thereby ensuring high system efficiency and lower cost.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A contactless power transfer system comprising:
 a power exchanging coil configured to exchange power with a transmitter power coil via a magnetic field;
 a field focusing element for receiving the magnetic field from the transmitter power coil and focusing the magnetic field onto the power exchanging coil, the field focusing element having a resonance frequency that is the same as a resonance frequency of the transmitter power coil; and
 a compensation coil coupled to the power exchanging coil such that the power exchanging coil is positioned between the field focusing element and the compensation coil, the compensation coil having a compensation coil capacitor and a resonance frequency different from the resonance frequency of the field focusing element for matching an impedance of the contactless power transfer system and compensating a change in phase resulting from a misalignment of the power exchanging coil and the transmitter power coil.

2. The system of claim 1, wherein the field focusing element comprises at least one resonator.

3. The system of claim 2, wherein the at least one resonator comprises a plurality of resonators arranged in an array wherein the plurality of resonators operate together as a single unit and a resultant magnetic field is emitted by the plurality of resonators that is focused onto the power exchanging coil.

4. The system of claim 2, wherein the at least one resonator comprises at least two different resonance frequencies.

5. The system of claim 4, wherein the at least two different resonance frequencies enable transfer of power and data signals.

6. The system of claim 1, wherein the power exchanging coil is coupled between the field focusing element and the compensation coil.

7. The system of claim 1, wherein the contactless power transfer system is electrically coupled to a vehicle.

8. A system comprising:
 a first power exchanging coil;
 a contactless power transfer system coupled to the first power exchanging coil, wherein the contactless power transfer system exchanges power with the first power exchanging coil via a magnetic field, wherein the contactless power transfer system comprises:
 a second power exchanging coil configured to exchange power with the first power exchanging coil via the magnetic field;
 a field focusing element for receiving the magnetic field from the transmitter power coil and focusing the magnetic field onto the power exchanging coil, the field focusing element having a resonance frequency that is the same as a resonance frequency of the first power exchanging coil; and
 a compensation coil coupled to the power exchanging coil such that the power exchanging coil is positioned between the field focusing element and the compensation coil, the compensation coil having a compensation coil capacitor and a resonance frequency different from the resonance frequency of the field focusing element for matching an impedance of the contactless power transfer system and compensating a change in phase resulting from a misalignment of the second power exchanging coil with respect to the first power exchanging coil.

9. The system of claim 8, wherein the first power exchanging coil comprises a transmitter coil and the contactless power transfer system comprises a receiver coil.

10. The system of claim 9, wherein the first power exchanging coil is electrically coupled to a power source and the contactless power transfer system is electrically coupled to a load.

11. The system of claim 10, wherein the load comprises an energy storage device.

12. The system of claim 8, wherein the field focusing element comprises at least one resonator.

13. The system of claim 12, wherein the at least one resonator comprises a plurality of resonators arranged in an array, wherein the plurality of resonators operate together as a single unit and a resultant magnetic field is emitted by the plurality of resonators that is focused onto the second power exchanging coil.

14. The system of claim 12, wherein the at least one resonator comprises at least two different resonance frequencies.

15. The system of claim 14, wherein the at least two different resonators frequencies enable transfer of power and data signals.

16. The system of claim 8, wherein the first power exchanging coil and the second power exchanging coil are configured to handle a bidirectional flow of power between the first power exchanging coil and the second power exchanging coil.

17. The system of claim 8, wherein the contactless power transfer system is electrically coupled to a vehicle.

18. A method comprising:
generating a magnetic field from power received from a first power exchanging coil;
receiving the magnetic field from the transmitter power coil using a field focusing element;
focusing the magnetic field onto a second power exchanging coil by the field focusing element, the field focusing element having a resonance frequency that is the same as a resonance frequency of the first power exchanging coil;
coupling a compensation coil to the power exchanging coil such that the power exchanging coil is positioned between the field focusing element and the compensation coil; and
compensating a change in phase and matching impedance using the compensation coil for enhancing power exchanging capability of the second power exchanging coil, wherein the compensation coil comprises a resonant frequency different from the resonance frequency of the field focusing element.

* * * * *